(12) United States Patent
Pillar et al.

(10) Patent No.: US 11,505,505 B2
(45) Date of Patent: Nov. 22, 2022

(54) PRODUCT AND METHOD FOR IMPROVING CEMENT PERFORMANCE

(71) Applicant: Suversol International, LLC, Minneapolis, MN (US)

(72) Inventors: James Pillar, Altoona, FL (US); Bengt Gunnar Martin Hall, Gothenburg (SE)

(73) Assignee: Suversol International, LLC, Minneapolis, MN (US)

( * ) Notice: Subject to any disclaimer, the term of this patent is extended or adjusted under 35 U.S.C. 154(b) by 126 days.

(21) Appl. No.: 17/100,756

(22) Filed: Nov. 20, 2020

(65) Prior Publication Data
US 2021/0147304 A1    May 20, 2021

Related U.S. Application Data

(60) Provisional application No. 62/937,827, filed on Nov. 20, 2019, provisional application No. 62/937,829, filed on Nov. 20, 2019.

(51) Int. Cl.
| | | |
|---|---|---|
| C04B 40/00 | (2006.01) | |
| C04B 28/02 | (2006.01) | |
| C04B 22/06 | (2006.01) | |
| C04B 18/10 | (2006.01) | |
| C04B 24/00 | (2006.01) | |

(52) U.S. Cl.
CPC ........ C04B 40/0046 (2013.01); C04B 18/101 (2013.01); C04B 22/062 (2013.01); C04B 24/00 (2013.01); C04B 28/02 (2013.01)

(58) Field of Classification Search
CPC ... C04B 18/101; C04B 18/248; C04B 20/023; C04B 20/026; C04B 22/002; C04B 22/062; C04B 24/00; C04B 28/02; C04B 40/0039; C04B 40/0046; C04B 2103/0008; Y02W 30/91
See application file for complete search history.

(56) References Cited

U.S. PATENT DOCUMENTS

| | | |
|---|---|---|
| 4,304,877 A | 12/1981 | Blount |
| 5,433,520 A | 7/1995 | Adams et al. |
| 2004/0144287 A1 | 7/2004 | Tardif et al. |
| 2012/0137931 A1 | 7/2012 | Chattopadhyay et al. |
| 2020/0115283 A1 | 4/2020 | Kvassnes et al. |

FOREIGN PATENT DOCUMENTS

| | | | |
|---|---|---|---|
| CN | 106417391 A | * | 2/2017 |
| CN | 106565373 A | * | 4/2017 |
| CN | 106615061 A | * | 5/2017 |
| CN | 106756920 A | * | 5/2017 |

OTHER PUBLICATIONS

International Search Report for corresponding International Application No. PCT/US2020/061675 dated Feb. 25, 2021, 2 pages.
Written Opinion for corresponding International Application No. PCT/US2020/061675 dated Feb. 25, 2021, 5 pages.
Turner et al., Potential Alternative Reuse Pathways for Water Treatment Residuals: Remaining Barriers and Questions—a Review, Water Air Soil Pollut 230:227 (2019).

* cited by examiner

*Primary Examiner* — Anthony J Green
(74) *Attorney, Agent, or Firm* — Winthrop & Weinstine, P.A.; Alicia Griffin Mills; Nadeem W. Schwen

(57) ABSTRACT

Products, including treatment compositions, and methods for improving cement performance are provided. More specifically, products and methods for improving cement hydration, and thus cement performance, using vegetation are provided. The vegetation may be processed into a vegetative extract that may be used to create a treatment composition. The treatment composition may be used to enhance hydration of cement. The products and methods disclosed herein may be used to create a stronger, lower cost, and longer-lasting cementitious product.

20 Claims, 7 Drawing Sheets

PRODUCT AND METHOD FOR IMPROVING CEMENT PERFORMANCE

FIELD OF THE INVENTION

The present disclosure relates to products and methods for improving cement performance. More specifically, the present disclosure relates to products and methods for improving cement hydration, and thus cement performance, using vegetation. The vegetation may be processed into a vegetative extract that may be used to create a treatment composition. The treatment composition may be used to enhance hydration of cement. The products and methods disclosed herein may be used to create a stronger, lower cost, and longer-lasting cementitious product.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A hydration reaction is a chemical reaction in which a substance reacts with water. Hydration is an important process in many applications. In these applications, it may be desirable to enhance the hydration reaction such to effect the end product(s) of the reaction. Thus, there exists a need for a product and method for enhancing hydration and, more specifically, for enhancing hydration reactions.

One specific area where enhanced hydration may be helpful is the production of concrete. The use of concrete around the world is ubiquitous. Concrete is used in vast quantities for construction in nearly every country. An industry group called Concrete Helper reported in 2018 that concrete is used more than any other man-made substance. At the time of this writing, over seventy percent of the world's population lives in structures made largely from concrete. Concrete is used to make buildings, roads, highways, bridges, and many other things requiring strength and resilience. Concrete is useful as a construction material due to its dual properties of being both malleable and easy to work with in its wet state, as well as being incredibly strong and durable after it sets, where it continues to gain strength over time. Concrete frequently has a strength of about 3000 psi, with some forms of concrete reaching strengths of over 20,000 psi. Concrete also generally has a longer useful life than other building materials.

Generally speaking, concrete is comprised of concrete paste and aggregates. The concrete paste is comprised of cement and water, whereas aggregates are comprised of coarse and fine inert granular materials such as sand, gravel, or crushed stone. In general, aggregate materials may be clean, hard, strong particles that are substantially free of coatings or other impurities. As concrete sets, the cement and water mixture hardens and binds the aggregates into a rocklike mass. The water causes the hardening of concrete through a process called hydration. Hydration is a chemical reaction in which the major compounds in cement form chemical bonds with water molecules and become hydrates or hydration products. The hardening process can continue for years, which means that concrete can continue to gain strength over time. In many uses, aggregates will account for about 60-75% of concrete by volume, while cement will account for about 7-15%, and water will account for about 14-21%, and air will account for about 8% of the total volume of the mixture.

Slump tests check the consistency and workability of fresh concrete and can also be an indicator of properly mixed batches. Concrete is placed or molded into shapes. This may be accomplished by utilization of forms to restrain fluid movement. The mason's aptitude determines the mortar or stucco consistency and workability. Mortar is defined as being lean or fat. Mortar and stucco require "fat" to retain its shape and impart the ability to hang and defy gravity. A fat mortar is obtained by using levels of air entrainment and hydrated lime to provide water retention and maintain the physical demands on the mortar.

In some cases, chemical admixtures may also be included in concrete. Most cementitious mixtures can benefit by utilizing one or more chemical admixtures. Admixtures are designed to improve and control the workability and productivity of the cementitious product. Admixtures may be used to reduce the cost of concrete construction, to modify the properties of hardened concrete, and/or to ensure the quality of concrete during mixing, transporting, placing and curing, for example. Typically, an admixture performs a specific duty. Such duty may include bonding, corrosion inhibition, shrinkage reduction, ASR reduction, control over workability, and water reduction to aid in strength. There are five classes of chemical admixtures: air-entraining, water-reducing, retarding, accelerating, and plasticizers (super-placitizers). Other admixtures generally fall into specialty categories that have functions that include: corrosion inhibition, shrinkage reduction, alkali-silica reactivity reduction, workability enhancement, bonding, damp proofing, and/or coloring, for example. The cost of the admixture varies depending on the quantity and type of admixture used. This cost is added to the final product, such as the cost of a cubic yard/meter of concrete. Thus, a way to reduce the amount of admixture needed would be useful.

There are many kinds of cement that can be used to make concrete. The most common kind of cement is Portland cement. Portland cement is made by heating lime, iron, silica and lumina to "clinkering" temperatures of about 2,500 to 2,800 degrees Fahrenheit. This heating process takes place in a rotating kiln. The result—the "clinker"—is roughly marble-sized spheres that are then ground down to a fine powder. In some cases the clinker is combined with gypsum, limestone, or supplementary cementing materials.

Other types of cement include, for example, rapid hardening cement, sulfate resisting cement, white cement, Portland Pozzolana Cement, hydrophobic cement, colored cement, waterproof Portland cement, Portland blast furnace cement, air-entraining cement, and high alumina cement. These cements have different additives (chemical admixtures) that give the cement certain properties that may optimize the resultant concrete for a particular use or place. For example, waterproof Portland cement may include some metal stearates, such as Ca or Al, for example, that are added during grinding. This cement may be used for construction of water-retaining structures like tanks, reservoirs, swimming pools, and dams, for example.

The specific composition of each type of concrete is selected based upon intended use. Stucco is primarily a wall covering. Block or concrete masonry units are building materials. Mortar or masonry mortar is used primarily in joints, stone construction, and parging. A commonality to all types of concretes is cement and aggregates.

It is the accepted wisdom and practice in the industry that the strength and character of concrete is determined by the quality of the paste (cement and water). The ratio of water to cement is thought to contribute to the strength of the paste. The industry adheres to the belief that high-quality concrete is produced by lowering the water-cement ratio as much as possible (i.e. using as little water as possible) without losing the property of workability of fresh concrete. The water to cement ratio is calculated by dividing the water in one cubic yard of the mix in pounds by the cement in the mix, also in pounds.

While many of the properties of concrete make it an ideal substance for construction, it is not without its downsides. The production of cement for use in concrete is thought to account for about 4% of the world's greenhouse gas emissions. It is generally accepted that for every ton of cement that is made, one ton of $CO_2$ is produced. Together with the energy requirements, water consumption, and generation of construction and demolition waste, the concrete industry is considered to have a significant impact on the environment.

One recognized method for reducing the carbon load associated with concrete production is to produce ultra-strong varieties of concrete, so that less concrete is needed to do the same job. Thus, there is a need in the art for a method of enhancing hydration of concrete that reduces the negative environmental impact, decreases cost, and increases the lifespan of concrete

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, the present disclosure relates to a hydration enhancing water and use of the hydration enhancing water to deliver compounds, elements, enzymes, and/or minerals to cement to enhance hydration and improve performance of cement.

In one embodiment, a method of making a treatment composition for improving cement performance is provided. The method comprises forming a conditioned water, creating a prepared vegetation, using the prepared vegetation and a first portion of the conditioned water to form a first vegetative solution and a first ash, forming a hydration enhancing compound using the first vegetative solution and the first ash, and adding the hydration enhancing compound to a second portion of the conditioned water to form the treatment composition.

The conditioning may be done via filtration and the conditioned may have a Total Dissolved Solids level of 0000 PPM. In some embodiments, the vegetation is one of live oak, philodendron, palm, bahia grasses, or aracae, and preparing the vegetation comprises grinding and milling the vegetation. Forming the vegetative extract may comprise mixing the first vegetative solution and the first ash. Forming the vegetative extract may further comprise adding a second vegetative solution and a second ash to the first vegetative extract and the first ash, wherein the first vegetative solution and first ash comprise palm. In one embodiment, the second vegetative solution and second ash comprise oak and the vegetative extract comprises 1 part oak, 1 part palm. In another embodiment, the second vegetative solution and the second ash comprise bahia and the vegetative extract comprises 1 part palm, 2 parts bahia. In some embodiments, forming a hydration enhancing compound comprises forming a vegetative extract by combining the first vegetative solution and the first ash, and forming a hydration enhancing compound by combining the vegetative extract with a mineral and the mineral may be lithium. In some embodiments, the treatment composition comprises the hydration enhancing compound at a level of 0.17%.

In a further embodiment, a treatment composition for improving cement performance is provided. The treatment composition comprises conditioned water a hydration enhancing compound, wherein the hydration enhancing compound comprises a first vegetative extract, a first vegetative ash, and a mineral.

In one embodiment, the conditioned water has a Total Dissolved Solids level of 0000 PPM. The vegetative extract and the vegetative ash may be derived from one of live oak, philodendron, palm, bahia grasses. The mineral may be lithium. In a further embodiment, the hydration enhancing compound further comprises a second vegetative extract and a second vegetative ash. The first vegetative extract and the first vegetative ash may be derived from palm and the second vegetative extract and the second vegetative ash may be derived from one of live oak, philodendron, or bahia grasses. In some embodiments, treatment composition comprises the hydration enhancing compound at a level of 0.17%.

In yet a further embodiment, a method for improving cement performance is provided. The method comprises making a treatment composition for improving cement performance and adding the treatment composition to cement at a higher water:cement ratio than is commonly used. Making the treatment composition may comprise forming a conditioned water, creating a prepared vegetation, using the prepared vegetation and a first portion of the conditioned water to form a first vegetative solution and a first ash, forming a hydration enhancing compound using the first vegetative solution and the first ash, and adding the hydration enhancing compound to a second portion of the conditioned water to form the treatment composition.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
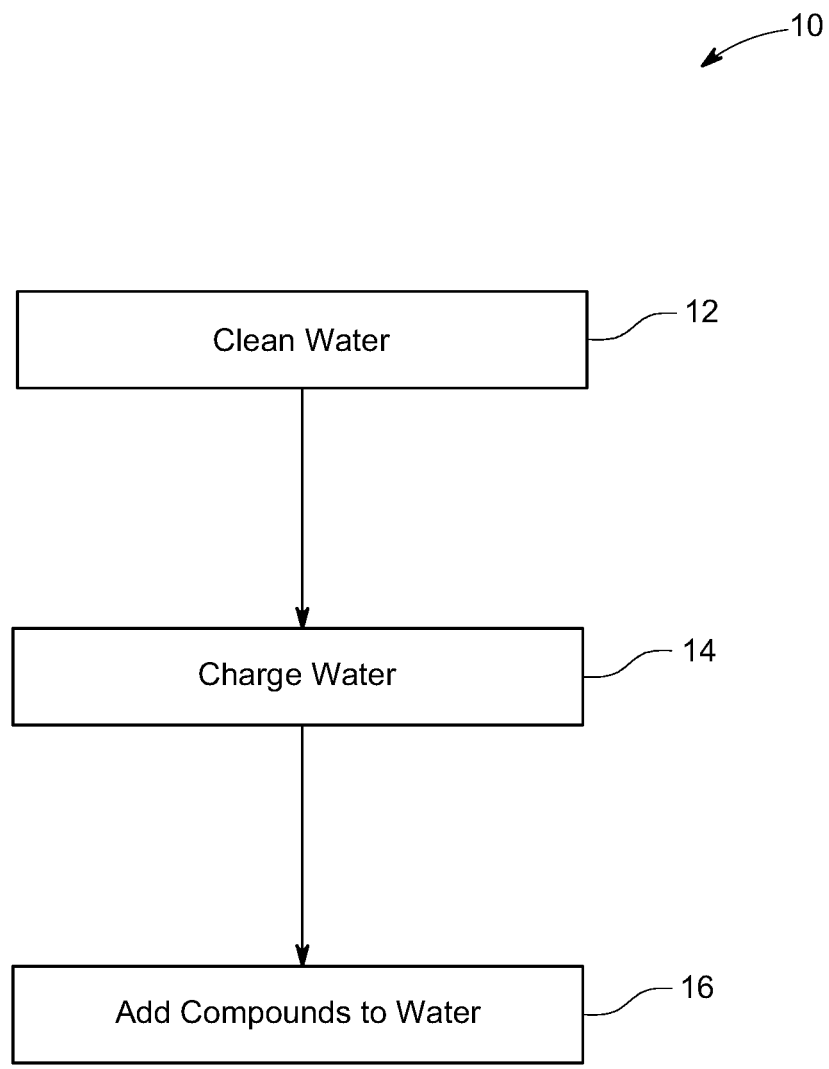
FIG. 1 illustrates a method creating hydration enhancing water, in accordance with one embodiment.

The present disclosure relates to products and methods for improving cement performance. More specifically, the present disclosure relates to products and methods for improving cement hydration, and thus cement performance, using vegetation. The vegetation may be processed into a vegetative extract that may be used to create a treatment composition. The treatment composition may be used to enhance hydration of cement. The products and methods disclosed herein may be used to create a stronger, lower cost, and longer-lasting cementitious product. Cement includes cementitious materials, such as cement plus lime, concrete, stucco, block, mortar, and precast. The products and methods disclosed herein may be used to create a stronger, lower cost, and longer-lasting cementitious product.

More particularly, in one embodiment, the present disclosure relates to a treatment composition such as a hydration enhancing water or pure pore solution and optional use of the hydration enhancing water to deliver compounds, elements, enzymes, and/or minerals during the formation of concrete. Even more particularly, the present disclosure relates to products and methods for improving cement performance using vegetation. It is to be appreciated that the products, including treatment compositions, and methods described herein may be used for enhancing hydration in a variety of applications outside of cement production as well.

In some embodiments, the present disclosure relates to products, including treatment compositions, and methods for delivering compounds, elements, enzymes, algae and/or minerals to improve cement performance. The products and treatments may be used to create a stronger, lower cost and longer-lasting cementitious product.

A hydration reaction is a chemical reaction in which a substance reacts with water. Hydration is an important process in many applications; one example is the production of cement by the crosslinking of calcium oxides and silicates. The speed of the reaction with water and the extent of the reaction can depend on the availability of reactants. Availability of the reactants may depend on the amount of the reactants in the water and in the substance. Further, availability of the reactants may be affected when reactants are made unavailable because of reactions of those reactants with contaminants in the water.

In concrete hydration, the hydration reactions use calcium and lime. In various embodiments, desired chemical reactions, such as those using calcium and lime, may be encouraged and enhanced by forming a hydration enhancing water, or treatment composition or pure pore solution, and combining the hydration enhancing water with cement. The hydration enhancing water delivers desirable reactants to the cement such that the desired hydration reaction may be encouraged. In some embodiments, contaminants are removed from the hydration enhancing water to minimize any undesirable reactions and removal of reactants.

In accordance with one embodiment, a method and treatment composition provided herein uses vegetative waste to enhance hydration of cement. In such embodiment, the method and treatment composition thus uses nature's recycling and dependability of vegetation to create a treatment composition that enhances hydration of cement.

Hydration Enhancing Water for Cement and Method of Making

The chemical combination of water and cement is hydration. Hydration provides the main strength for both concrete and mortar. Concrete strength has been thought to generally correlate to the water:cement ratio. Traditionally, the lower the water:cement ratio, the stronger the concrete. Mortar strength is in the ability to retain water and does not follow the traditions of concrete. There is no numerical limit on the initial amount of water, and it can be retempered without any specific water requirements. Mortar strengths are determined in the lab under controlled conditions such as component batch weights, water content, and curing. In situ mortars are generally not expected to reproduce the strengths of lab mortars. Cement continues to hydrate as long as water is available. Purposeful curing may aid hydration of concrete, as stucco and mortar generally need to retain as much mix water as possible due to loss associated with absorption from contacting masonry units and/or evaporation. Ultimate hydration, or 100% hydration, does not occur in reality for either concrete or mortar. The product and methods disclosed herein bring ultimate hydration closer.

The methods provided herein involve developing a treatment composition to enhance hydration. The treatment solution may be a hydration enhancing water or pure pore solution. Stability and control within the pore solution facilitates chemical reactions, moving the process towards complete chemical reactions, and continuous dissolution of cement minerals.

In one embodiment, a hydration enhancing water, also referred to as a treatment composition, a cement enhancer, or a pure pore solution, for enhancing cement hydration is disclosed. In one embodiment, the hydration enhancing water or treatment composition is water that has been loaded with vegetative extracts. In another embodiment, the hydration enhancing water or treatment composition may be water that is loaded with one or more reactants that are used in the cement hydration. In some embodiments, the hydration enhancing water is water that has been cleaned before addition of the one or more reactants to the water.

The treatment composition, or hydration enhancing water, increases strength of a resulting concrete by increasing water:cement ratios, rather than decreasing water:cement ratios as is typically done. Increasing the water:cement ratio reduces the total volume of cement required for a specific use. The product and methods described herein improve flexibility and workability of the cement and reduce permeability by targeting any or all hydration properties, including heat of hydration, Calcium silicate hydrate (CSH) development, and pH.

In typical cement production, as the water:cement ratio increases so does porosity. This is not the case using the methods and products, including treatment compositions, disclosed herein. The cement particles spacing is at least partially controlled by the pure pore solution. As available water is consumed by the hydration reaction, the space left behind is filled with cement hydrates.

Cementitious mixtures may benefit by utilizing one or more vegetative or chemical admixtures. Admixtures are designed to improve and control the workability and productivity of the cementitious product. Typically, an admixture preforms a specific duty. Such duty may include bonding, corrosion inhibition, shrinkage reduction, ASR reduction, control over workability, and water reduction to aid in strength. The cost of the admixture varies depending on the quantity and type of admixture used. This cost is added to the final product, such as the cost of a cubic yard/meter of concrete. The products and methods disclosed herein can reduce or eliminate the need for multiple admixtures by being an all-inclusive cement enhancer. The methods can improve the hydration reactions of cement, used for the creation of concrete, stucco, block, mortar, and precast, and not limited to any one particular chemistry.

In general, the treatment compositions disclosed herein may be considered all-inclusive cement enhancers. The method of the invention can improve the hydration reactions of cement; used for the creation of concrete, stucco, block, mortar and precast, but not limited to any one particular chemistry. Accordingly, if desired, multiple admixtures may be avoided.

FIG. 1 illustrates a general method 10 for creating hydration enhancing water for cement hydration, in accordance with one embodiment. The method may include cleaning water 12 and adding compounds to the water 16. In further embodiments, the method may include charging the water 14 before adding the compounds to the water. Each of these steps is described more fully below.

Water commonly has compounds or elements suspended therein, such as fluorides, chlorines, minerals, or other. These compounds or elements may be referred to herein as contaminants and may mitigate the occurrence of desirable reactions, such as hydration reactions, when water containing them is used. For example, reactants necessary for desired reactions may react with contaminants in the water in other reactions and thus be unavailable for the desired reactions. It is to be appreciated that while these compounds or elements are referred to as contaminants, the compounds or elements are not necessarily ones that would be considered contaminating to water in general—merely that they may limit the desired hydration reactions. While the hydration enhancing water may be formed even with the presence of these contaminants, a hydration enhancing water with increased effectiveness is formed by first cleaning the water and removing contaminants. By removing contaminants and then adding useful compounds, minerals, and/or elements, it is possible to favor desired reactions during a hydration reaction. Further, removal of contaminants can minimize creation of byproducts formed as a result of reactions with those contaminants.

A first step in creating the treatment composition, also referred to as hydration enhancing water or pure pore solution, may thus be to clean the water 12. Any method for cleaning or filtering the water 12, including any of, or a combination of, for example, distillation, microfiltration, ultrafiltration, reverse osmosis, carbon filtration, UV radiation, and/or deionization/ion exchange may be used.

In one embodiment, water, treated or untreated, may be charged 14 and run through an ion exchange resin, or series of exchange resins, to further clear contaminants. This is an optional step and may not always be included. The positive or negative charge of the ions is used to remove dissolved ionic contaminants from the water and exchange the dissolved ionic compounds for other compounds of the same charge that may be desirable for the hydration reaction, thus adding compounds to the water 16. These desirable compounds may be loaded onto the exchange resin material. Accordingly, in some embodiments, a custom exchange resin is provided for use during the deionization process. The custom exchange resin may be customized to remove specific contaminants and/or to add specific compounds. In some embodiments, an exchange resin may not be used and compounds may be added to water separately.

It is to be appreciated that it is not necessary to remove all, or any, of the contaminants and there may be varying levels of acceptable contamination level depending on the contaminant and the desired hydration reaction.

After removal of contaminants 12 and 14, and optional exchange for desirable compounds 16, further desirable compounds may be added 16 to enhance desired hydration reactions. It is to be appreciate that the term "compounds" is used to generally refer to any compound, mineral, or enzyme that may be useful for the ensuing hydration reaction. In some embodiments, the compound may comprise extracts from vegetation, discussed more fully below. These compounds may be added via a loading resin or vegetative extract. Further, while the term "loading resin" may be generally used, any solution, solid, gel, or other containing the desired compounds may be used to add the compounds to the water to form a hydration enhancing water. In some embodiments, the water may be charged to a different ion state to enable it to carry the compounds.

Accordingly, in one embodiment, the water is cleaned 12, the water is charged 14, and compounds, such as via a loading resin or vegetative extract, are added to the water 16. For concrete, the desired hydration reactions use calcium and lime. Accordingly, the loading resin may include calcium and lime. Further, the loading resin or vegetative extract may vary based on the specific type of cement being used, whether Portland, ready-mix, self-consolidated, or other. That being said, while the make-up of the loading resin or vegetative extract may be modified for the specific make-up of the cement mix being used, a general cement resin or vegetative extract may alternatively be used and will enhance hydration.

In alternative embodiments, the loading resin or vegetative extract may be added to water that has not been cleaned. Further, in some embodiments, the water may not be charged before adding the loading resin or vegetative extract. The content of the loading resin or vegetative extract is chosen based on the application for the hydration enhancing water. In general, the loading resin may comprise enzymes from vegetation, minerals, and/or other compounds. The specific compounds chosen are ones used in the reactions desired in the ensuing hydration process.

The loading resin or vegetative extract may be varied depending on the specific application for the hydration enhancing water. In one embodiment, the loading resin may be designed only to deliver desired compounds to the water. In another embodiment, the loading resin or vegetative extract may be designed to elevate the pH level of the water and deliver desired compounds to the water. In some embodiments, the loading resin or vegetative extract includes a vegetation product that creates an enzyme. In certain embodiments, palm, live oak, or bahia and/or extracts thereof may be used.

In one embodiment, the hydration enhancing water comprises an enzyme, a vegetation product, and/or minerals. The enzyme facilitates charging of the water. Charging of the water and allows increased dissolution of minerals, for example to a supersaturation of the water, without precipitation or fallout. The vegetation products increase the pH of the water. The high pH base facilitates dissolution of minerals in the water. The minerals added to the water may be minerals that react during hydration to form the desired hydration products. The charged water carries minerals, compounds, and/or enzymes in a dispersed and reactive state. The water can be customized to target carrying different compounds based on the different voltages applied to the water.

The thus formed hydration enhancing water may be used in the place of regular water for cement hydration. In some embodiments, the hydration enhancing water may be used in combination with regular water for cement hydration.

In accordance with methods disclosed herein, vegetative waste may processed to produce a vegetative extract that may be used for loading the water. Such method uses the natural elements and minerals in the vegetation. Such vegetative extract may itself provide compounds for enhanced hydration.

Figure 2:
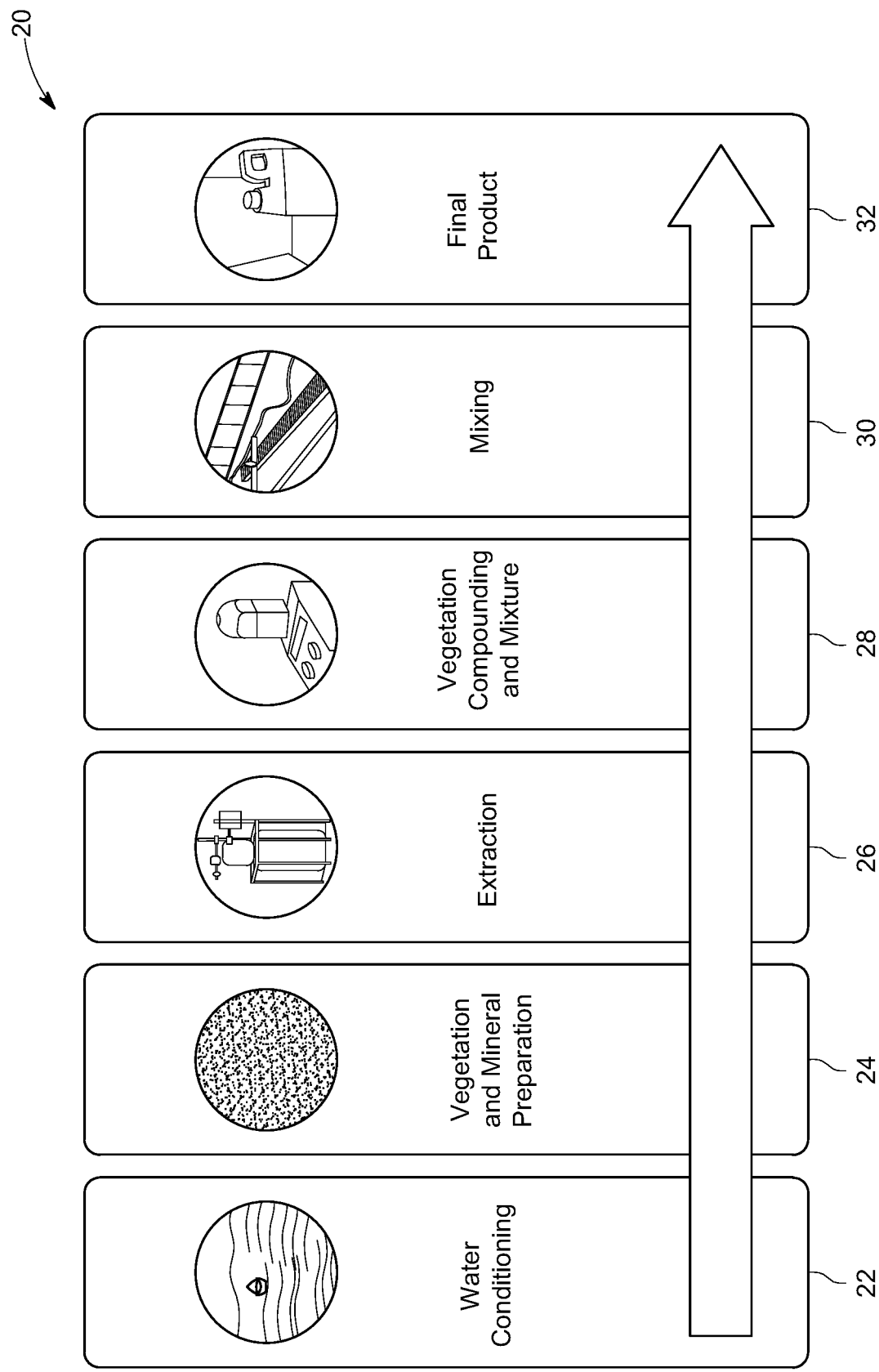
FIG. 2 illustrates a method creating hydration enhancing water, in accordance with a further embodiment.

FIG. 2 illustrates a method 20 for creating hydration enhancing water for cement hydration using vegetation and mineral(s). In some embodiments, the vegetation may be Live Oak, Philodendron, Palm, Bahia grasses, or Aracae, and the mineral(s) may be lithium. As shown, the method includes water conditioning 22, vegetation and mineral preparation 24, extraction 26, vegetation compounding 28, and mixing 30 to result in a final product 32.

Water commonly has compounds or elements suspended therein, such as fluorides, chlorines, minerals, or other—referred to herein as contaminants. First steps for making a treatment compositions for enhanced hydration thus comprises providing water and conditioning the water 22. In some embodiments, water conditioning may comprise cleaning and conditioning is done to a Total Dissolved Solids (TDS) level of 0000 PPM. Using basic tap water (or any other water source), the water is cleaned and removed of contaminants by filtration methods including but not limited to, UV, carbon, reverse osmosis, deionized, distilled and other purification processes. The pure water may then be maintained under vacuum pressure to prevent unwanted contamination. In some embodiments, water conditioning is only nominally done and the conditioned water is effectively the same as the originally provided water. The conditioned water from step 22 may be referred to herein as conditioned water, pure water, or water resulting from step 22.

Methods provided herein generally involve adding compounds to the conditioned water. As shown in FIG. 2, the compounds may be specifically prepared 24 for such addition. In the embodiment of FIG. 2, a vegetation solute is prepared and minerals are prepared 24. Several of the steps of FIG. 2, for example steps 24 and 26, may be done multiple times to process a plurality of types of vegetation.

Vegetation may include hardwood, softwood, grasses, and the like. For example, vegetation may include Live Oak, Araceae including Philodendron, Palm and Bahia grasses. Minerals may include gypsum, calcite and graphite, Lithium, Sodium, Silicon, Potassium, Calcium and Magnesium. Preparation of the vegetation and minerals may include grinding and milling the vegetation to a fineness that allows for complete or near complete surface interface. Milling or grinding methods of choice both wet and dry generally refines the vegetation, minerals, and elements chosen for compounding. The grind fineness may vary from coarse to microparticle to nano particle scale based at least on the desired solution and final extraction method. For example, if only ashing or distillation is done, a coarse grind may be used. While grinding and/or milling are discussed as specific methods for preparing vegetation, other manners for preparing the vegetation for extraction may alternatively be used.

After preparation, storage of the prepared vegetation and minerals may be done to maintain their quality until use. The vegetation may be stored in the ultra-pure conditioned water. The storage of the prepared vegetation may be under vacuum, nitrogen blanket, or by other means to prevent influence from environmental conditions. The minerals may be stored to prevent foreign contamination prior to soaking and storage with vegetation extracted solvent (formed in step 24).

Figure 3:
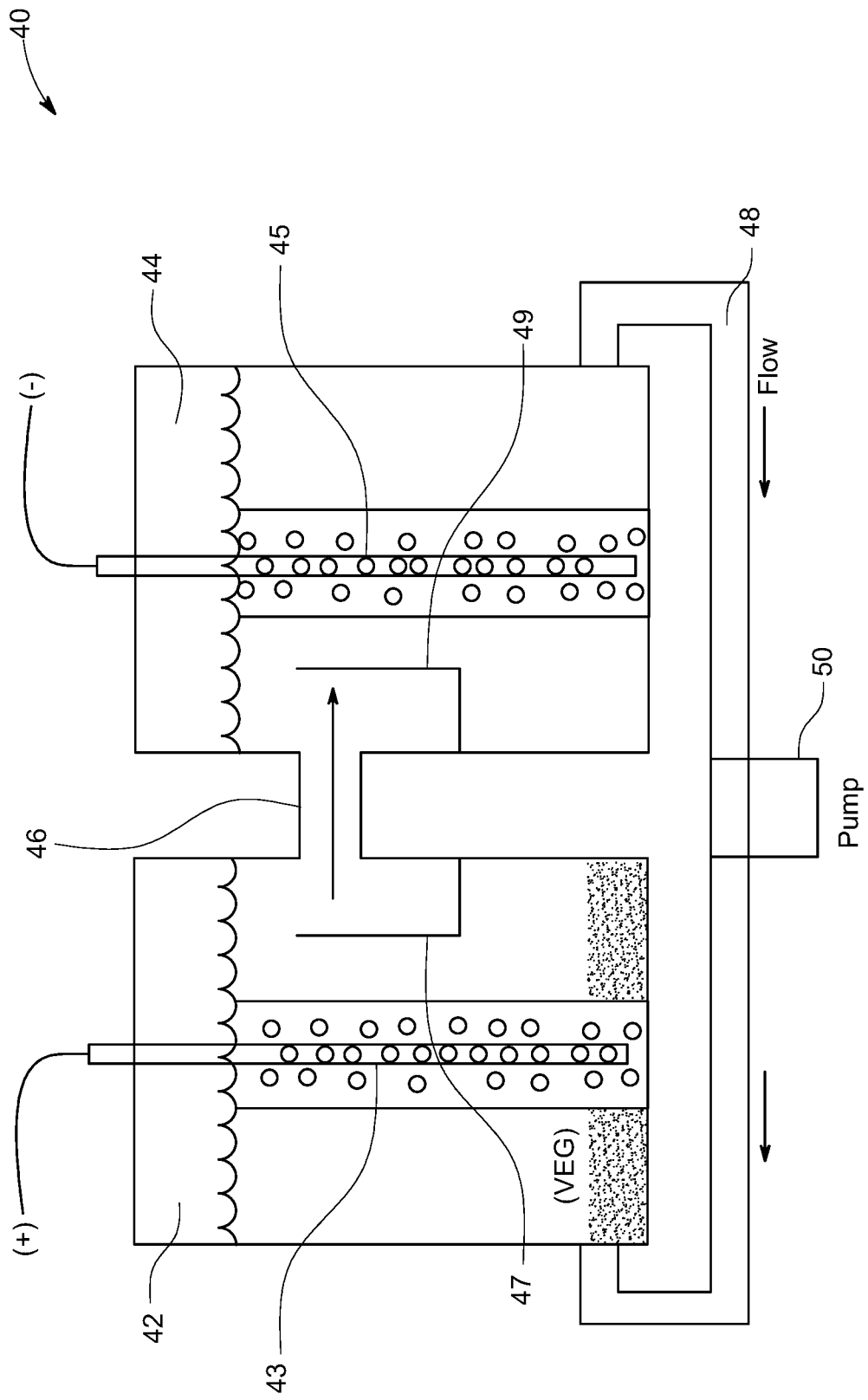
FIG. 3 illustrates a vegetative extract reactor, in accordance with one embodiment.

FIG. 3 illustrates a vegetative extract reactor 40. The vegetative extract reactor 40 includes a first chamber 42 and a second chamber 44. A channel 46 is provided between the first chamber 42 and the second chamber 44. Electrodes 43 and 45, optionally encircled by barriers, are provided in the first chamber 42 and the second chamber respectively. Flow piping 48 is also provided between the first chamber 42 and the second chamber 44 with a pump 50 driving the flow.

Returning now to FIG. 2, extraction 26 may comprise forming a vegetative extract and/or vegetative ash and may be done using the Vegetative Extract Reactor of FIG. 3. In general, forming the vegetative extract and/or vegetative ash may be done using the conditioned water, for example a first portion of the conditioned water. Prepared vegetation from step 24 are extracted. These may be referred to as vegetation solutes. The prepared vegetation is put in the first chamber 42. The chambers 42, 44 are filled with conditioned water to achieve a flowable volume. The solution pH may range from acidic to very basic. The second chamber 44 is filled proportionally with the first chamber 42. Both chambers may fitted with electrodes such as, but not limited to, carbon, platinum, and silver. The solvent is then processed with an electrical current and circulation is set from 0.10l/min-1200l/min, flowing from chamber 1-2. Agitation of chamber 1 contents may also be necessary, dependent on contents and density of the solute.

In the embodiment shown in FIG. 3, the first chamber 42 is set to positive and the second chamber 44 is set to negative. Power voltage is varied and can range from 1 to 32 volts direct and/or alternating. The solution (conditioned water plus extract from the vegetation) is circulated between the chambers 42, 44. Circulation between the chambers is continuous, flowing from chamber 42 to chamber 44 across the channel 46 and returning to chamber 42 through the piping 48. Walls 47, 49 may optionally be provided proximate the channel 46 for aiding in controlling flow. Total dissolved solids (TDS), pH, and/or temperature may be monitored. In one embodiment, 1500 ppm TDS and a pH of 14 may be achieved.

After cycling, the first chamber 42 holds solvent soaked extract (and vegetative solution) and the second chamber holds a vegetative solution. Once desired levels have been met, or TDS and pH stabilize the second chamber 44 may be emptied and its contents stored separate from the contents of the first chamber 42. This solution, referred to as a vegetative solution may be used in the vegetation compounding and mixture of step 28. Storage may generally be in any manner that substantially prevents contamination to the specimens, such as vacuum and nitrogen.

The homogeneous mixture, the solvent soaked vegetation, of the first chamber 42 may be removed from the chamber and stored in a protected environment in any suitable manner. The contents is then prepared for use. Four methods for preparing the vegetative solution and vegetative ash from the contents of the first chamber 42 are provided as examples. In general, any remaining vegetative solvent in the first chamber 42 may be removed before processing the remaining contents.

In the first exemplary method for preparing the vegetative solution and vegetative ash, the solvent soaked vegetation is processed to remove any remaining solute. This may comprise extracting the solute, by means of vacuum filtration, and then storing the solute under vacuum or nitrogen blanket. The remaining contents may then turned to ash by, for example, furnace burning. The ash may be stored under vacuum.

In the second exemplary method for preparing the vegetative solution and vegetative ash, the solvent soaked vegetation, is distilled, collected and turned to ash by, for example, furnace burning. The ash may be stored under vacuum.

In the third exemplary method for preparing the vegetative solution and vegetative ash, centrifuge extraction is used. In the fourth exemplary method for preparing the vegetative solution, press extraction is used. As with the first and second exemplary methods, extracted solute and ashes are stored in protected environment.

Ash preparation is done to process the ash separated from the vegetative solution. In general, ashes may be prepared by soaking in the previously prepared processed water, or hydration enhancing water. The thus formed heterogeneous solution can be stored for minutes or indefinitely prior to a further extraction. Such further extraction may be done in any suitable manner, for example by drip filtration, vacuum filtration, or centrifuge.

After extraction, the method 20 includes vegetation compounding and mixture 28 to form a hydration enhancing compound. The vegetative extract, including the vegetative solution and/or ash from step 26, as well as mineral and elements from step 24, are combined. The ratios used in combination may vary. Example 1: 1-part Oak: 1-part Palm: 2-part Bahia. Example 2: 2-part Oak:1-part Palm:3-part Bahia. Each vegetative extract may be combined and influenced by the addition of heat and continuous stirring. Addition of heat is optional and use may depend on the potential exothermic reactions of the chosen combinations of extracts. Stir rates may be varied to ensure a complete homogenous mixture. Example: Oak+Palm, heated 70-100 deg Celsius, stir rate 300 rpm.

The treatment composition, also referred to as hydration enhancing water and pure pore solution, is created by mixing the hydration enhancing compound from step 28 with the conditioned water, for example a second portion of conditioned water, from step 22. Such mixing may be done using a substance mixing reactor.

Figure 4:
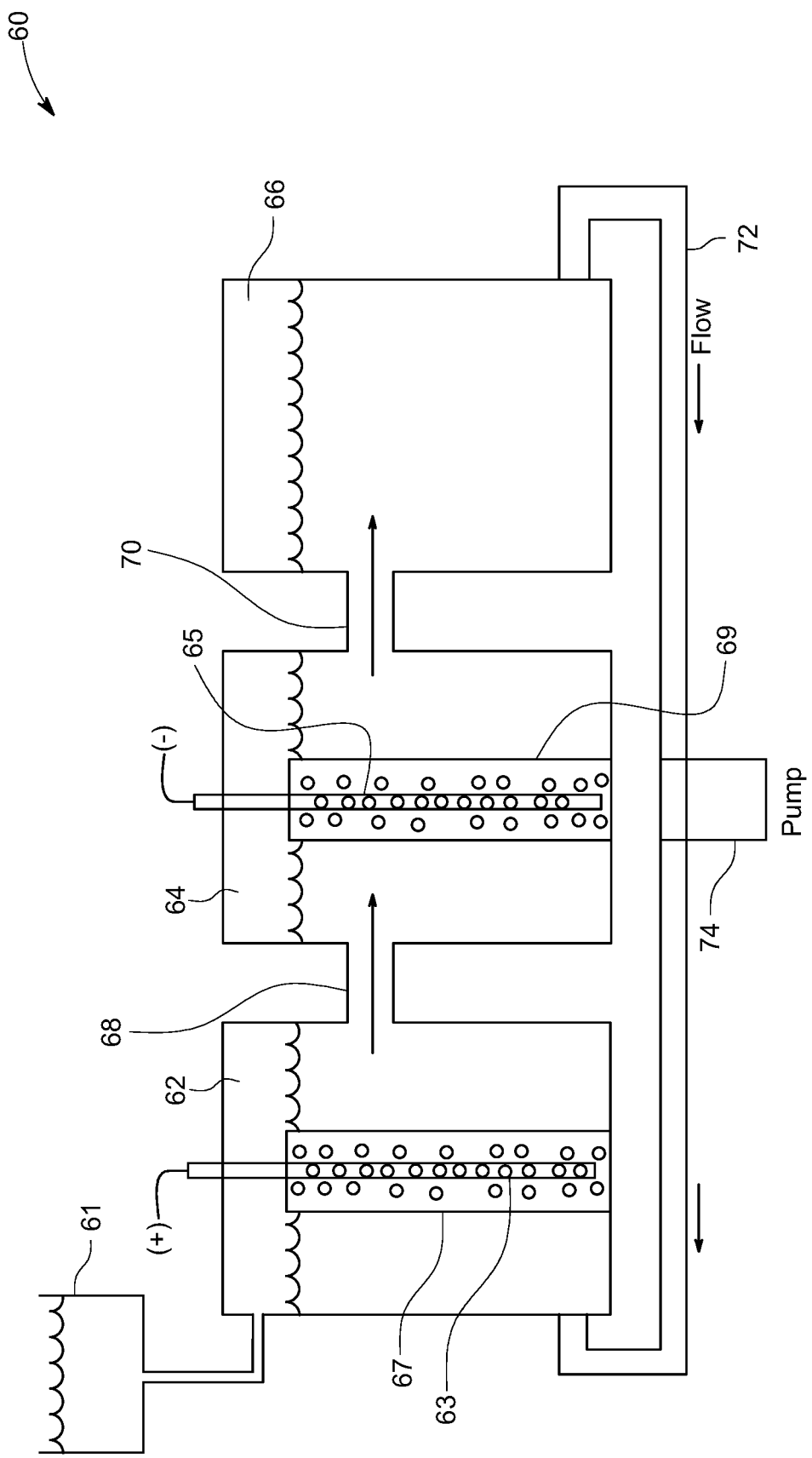
FIG. 4 illustrates a substance mixing reactor, in accordance with one embodiment.

FIG. 4 illustrates a substance mixing reactor 60 in accordance with one embodiment. As shown, the reactor 60 includes a reservoir 61, first chamber 62, second chamber 64, and third chamber 66. The reservoir 61 holds conditioned water from step 22 and treatment composition from step 28. A first channel 68 allows flow from the first chamber 62 to the second chamber 64 and a second channel 70 allows flow from the second chamber 64 to the third chamber 66. The first chamber 62 and the second chamber 64 include electrodes 63 and 65, optionally encircled by barriers, respectively. The barriers may be designed to provide flow control and create turbulence. Piping 72, driven by a pump 74 returns flow from the third chamber 66 to the first chamber 62.

The electrodes in the first and second chambers 62, 64 may be set to positive for the first chamber 62 and negative for the second chamber 64. In one embodiment, voltage set at 32 volts and flow rate adjusted to 300 L/min. The three chambers are filled with prepared water to a flowable volume. Hydration enhancing compounds (from step 28), with or without additional elements and/or minerals are added to the first chamber 62. TDS, pH, and/or temperature may be monitored, for example at the third chamber 66. Upon reaching desired concentration of hydration enhancing compound dissolved in the water, the contents of the third chamber 66 are removed and may be packaged for use. The contents of the third chamber 66 is the hydration enhancing water, or treatment composition, referenced as final product in step 32. The concentration levels of the hydration enhancing compound (optionally combined with other elements and/or minerals) may be as low as about 0.1%, for example as low as 0.17%, change to the base ultra-pure water or as high as about 99.83%. The hydration enhancing compound thus may be present in the treatment composition at between 0.1-0.3%, 0.3-0.5%, 0.5-0.7%, 0.7-1%, 1-5%, 5-10%, 10-25%, 25-50%, 50-75%, 75-90%, or 90-99.83%.

The thus formed treatment composition, or hydration enhancing water, may be used to enhance hydration in any industry that utilizes a hydration reaction. Specific description is given of use of such treatment composition in concrete production by enhancing concrete hydration but such description is for illustrative purposes only is not intended to be limiting.

Concrete Hydration

Figure 5:
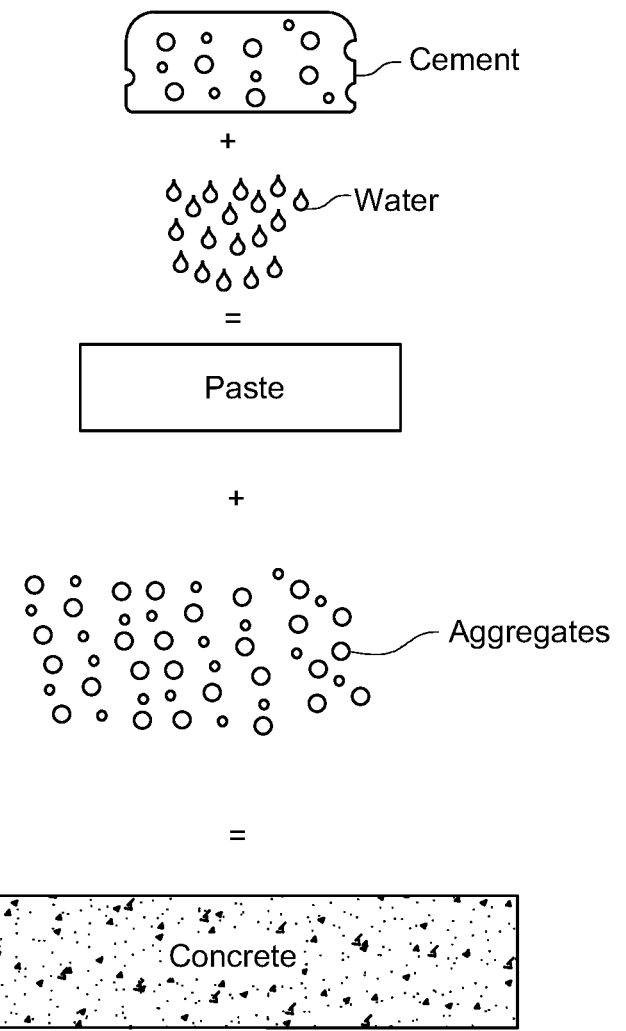
FIG. 5 illustrates the elements that comprise concrete.

As can be seen in FIG. 5, concrete is generally comprised of paste (also referred to as "concrete paste") and aggregates. The paste is comprised of cement and water. One of the more common types of cement used is Portland cement, although there are many different types available. For purposes of illustration and description, Portland cement will be used and described herein. However, it is to be understood that the present disclosure is not limited to embodiments that manufacture Portland cement, but rather the present disclosure describes a product, a hydration enhancing water, and method that may be used to form any type of known or after-arising cement formulation. Further, the present invention includes using hydration enhancing water in a wide variety of applications outside of the concrete industry.

In the formation of concrete, wet concrete paste binds to aggregates to form a hardened rock-like mass of substantial strength known as concrete through hydration. When water is introduced to the ground clinker, a complex set of chemical reactions, mostly exothermic, take place in a hydration process. As the reactions proceed, the products of the hydration process gradually bond the individual sand and gravel particles, and other components of the concrete, together to form a solid mass. The different chemical reactions that occur during hydration give different properties to the final product. For example, as described more fully below, aluminates react with water in the beginning and affect the route of the reactions at early periods of hydration. Silicates affect later stage reactions. Hydration occurs for and over a relatively long period of time, for example a number of years in some cases. However, the rate of hydration continuously decreases over time. Further, over time, the size of unhydrated cement particles decrease.

Initially, the chemical properties of stucco, concrete, and mortar are similar and maintain a pH of about 13. Soon after placement, the pH values begin to decrease. Reactions occur between carbon dioxide in the atmosphere and alkalis in the concrete, stucco, and mortar. The carbonation initially only affects concrete at the surface. However, the thinner counterpart of mortar and stucco are quickly and deeply penetrate due to the high water content and higher porosity, which allows more alkali to be exposed to the carbon dioxide. Eventually the carbon dioxide reactions will envelope the cement particles, causing hydration to stop. This carbonation effect causes shrinkage and cracking and inhibits further strength development, thus allowing for corrosion of embedded lath and reinforcements. Concrete has an advantage of thickness, frequently with embedded steel that is sufficiently deep to maintain a higher pH to protect the concrete from corroding. However, over time concrete too will see a reduction in pH and breakdown, enabling an attack on the embedded reinforcement as well as cracking and spalling.

The cement enhancer increases strengths by increasing water cement ratios not by decreasing, thereby reducing the total volume of cement required for a specific use. The invention improves flexibility, workability and reduces permeability by targeting all hydration properties including heat of hydration, C—S—H development and PH.

Portland cement is made by heating lime, iron, silica, and lumina to "clinkering" temperatures of about 2,500 to 2,800 degrees Fahrenheit. This heating process takes place in a rotating kiln. The result—the "clinker"—comprises roughly marble-sized spheres that are then ground down to a fine powder. In some cases the clinker is combined with calcium sulfate dihydrate (gypsum), limestone or supplementary cementing materials. In the anhydrous state, four main types of minerals are normally present in the clinker: alite, belite, aluminate ($C_3A$) and a ferrite phase ($C_4AF$). Also present are small amounts of clinker sulfate (sulfates of sodium, potassium and calcium) and gypsum, which is generally added when the clinker was ground.

Cement hydration may be viewed as a series of chemical reactions taking place at one time. The degree of hydration is the fraction of cement that has fully reacted with water relative to the final reacted cement. During creation of concrete, upon the addition of water to the clinker, three principal reactions occur. First, almost immediately after adding water, some of the clinker sulphates and gypsum dissolve producing an alkaline, sulfate-rich, solution.

Second, shortly after mixing, the tricalcium aluminate ($C_3A$, also referred to as aluminate) phase reacts with the water to form an aluminate-rich gel (Stage I). The gel reacts with sulfate in solution to form small rod-like crystals of ettringite. The aluminate ($C_3A$) reaction with water is short and strongly exothermic and is followed by a period of a few hours of relatively low heat evolution. This is called the dormant, or induction, period (Stage II).

The first part of the dormant period, up to approximately half-way through, corresponds to when concrete can be placed. As the dormant period progresses, the concrete paste becomes too stiff to be workable.

Third, at the end of the dormant period, the alite and belite in the cement start to react, thereby forming calcium silicate hydrate and calcium hydroxide. This is the main period of hydration (Stage III), during which time concrete strengths increase. The individual grains react from the surface inwards, and the anhydrous particles become smaller. Aluminate ($C_3A$) hydration also continues, as fresh crystals become accessible to water.

Figure 6:
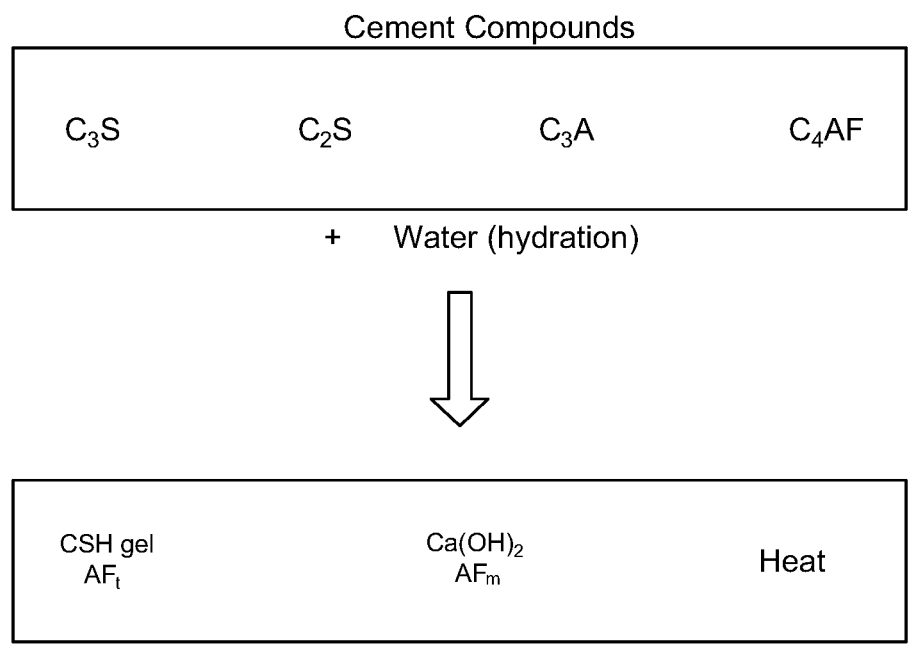
FIG. 6 compounds in cement prior to and after hydration.

Thus, as shown in FIG. 6, Portland cement clinker has four main mineral phases, including: tricalcium silicate ($C_3S$); dicalcium silicate ($C_2S$); tricalcium aluminate ($C_3A$); and tetracalcium aluminoferrite ($C_4AF$). Generally speaking, cements with high or very high $C_3S$ constituents are capable of creating early strength at faster rates; cements with low $C_3A$ amounts, low $C_3S$ amounts, and higher $C_2S$ amounts have lower heats of hydration; and cements with low to very low $C_3A$ amounts have the most resistance to sulfates. Thus, a cement composition formed using the hydration enhancing water, or pure pore solution or treatment composition, can be chosen to have the qualities desired for a particular use by targeting formation of specific minerals.

The product and methods disclosed herein may be tailored to meet a specific cement formulation's unique signature, for ultimate hydration achievement. Additionally, the product can be altered for specific batch designs by changing its chemical substances to be ideally suited for the concrete mixture's intended use. For example, not all plasticizers are suitable for every polymer, each one has a different effect upon its host molecule. The pure pore solution may be adjusted to optimize the fit with respect to the molecule configuration of the mix and admixtures in use.

Each component of the hydration enhancing water, or pure pore solution, may be chosen to target and enhance reactions of the final chemistry. In the case of cement, this enhancer promotes absolute hydration of the cementitious particles. The predetermined solute is prepared to achieve maximum surface interface, which may include, but is not limited to, compounds, elements, enzymes, algae, and/or minerals. The solutes are processed to microparticle and non-particle scale, then introduced to the solvent (for example, water), by utilizing temperature control, particle shear, mixing and stirring methods, and brought to a state of predetermined saturation levels from unsaturated to supersaturated. The solvation of each is controlled with and without direct and alternating electrical influence on variable concentrations, which are tailored to the end hydrate reactions of cements.

In one embodiment, the hydration enhancing water or treatment composition comprises water combined with vegetative extract from palm/philodendron. The vegetative extract brings in natural elements and minerals, including earth metals, present in the palm/philodendron waste. In some embodiments, the hydration enhancing water or treatment composition has increased calcium, potassium, sodium, magnesium, and/or phosphorous compared to water. In combination, the hydration enhancing water may exhibit about a 1.7% change to the base water solution There are several hydration products formed by the reactions between cement and water. The products and methods disclosed herein may be targeted to increase or decrease the production of one or more of these products. As is further shown in FIG. 6, the main products of hydration reactions are calcium silicate hydrate (CSH), calcium hydroxide (CH), and the AFt (the most common being ettringite) and AFm (the most common being monosulfate) phases, which are compounds of $C_3A$, anhydrite and water. Hydrated cement may typically be comprised of about 50% CSH and about 15-25% CH by mass.

Calcium silicate hydrate (CSH), the main hydration product in the formation of concrete, is the primary source of concrete strength. The ratio of SiO2 to CaO (the Si/Ca ratio) is variable but typically approximately 0.45-0.50 in hydrated Portland cement but up to about 0.6 if slag, fly ash, or microsilica is present. Because calcium silicate hydrate is a primary source of concrete strength, the products and methods disclosed herein, and the exchange resin and/or loading resin or vegetative extract used may be customized to increase the reactions resulting in calcium silicate hydrate.

Calcium hydroxide (Ca(OH)2 or CH) is formed mainly from alite hydration. Alite has a Ca:Si ratio of 3:1 and C—S—H has a Ca/Si ratio of approximately 2:1. Excess lime in the mixture can lead to the production of CH.

Monosulfate tends to occur in the later stages of hydration. Ettringite is present as rod-like crystals in the early stages of reaction or sometimes as massive growths filling pores or cracks in mature concrete or mortar.

Turning back to the hydration enhancing water and methods for enhancing hydration, the hydration enhancing water may be used to form the concrete paste and enhance hydration of the cement in formation of concrete. Using the hydration enhancing water, desired hydration products are encouraged. In general, the heat of hydration remains the same as cement hydration without hydration enhancing water.

As previously discussed, stability and control within the treatment composition, or pure pore solution, facilitates chemical reactions and continuous dissolution of the cement minerals. The pure pore solution creates more paste and increases density in the CSH morphology. Control over the microstructure is achieved by sustaining hydration at the cement particle, reducing tension of the capillary water, and maintaining heat of hydration to control needle growth and crystal structure.

Hydrogen bonding and dissolving of ions in water are of importance in the hydration process of cement. This same principle is a basis of the product and methods described herein. Using a building block approach, in one embodiment, one starts with an ultra-pure vehicle, load with organic and inorganic molecules and compounds, pure substances and elements into homogeneous mixtures to be carried efficiently through the targeted chemistry. The homogeneous mixtures may then be processed individually into a solvent. This ultra-pure solvent may be maintained under vacuum pressure to prevent unwanted contamination. The solvent is then processed with an electrical current utilizing one or more electrodes such as, but not limited to, carbon, platinum, and silver.

In one embodiment, a hydration enhancing water for cement hydration comprises an enzyme, a vegetation product, and minerals. As previously discussed, the enzyme facilitates charging of the water. Charging of the water allows increased dissolution of minerals without fallout. The vegetation products increases the pH of the water. The high pH base facilitates dissolution of different minerals into the water. The minerals added to the water are minerals that react during hydration of the concrete to form the desired hydration products, such as calcium silicate hydrate. The resultant charged hydration enhancing water carries desirable minerals, compounds, and/or enzymes in a dispersed and reactive state.

In one embodiment, the hydration enhancing water is reactive against alkali. The free alkali in the cement react and result in a denser and harder concrete. In some embodiments, after the water is cleaned and the loading resin or vegetative extract added, only desired compounds are in the water and, upon hydration, no undesirable byproducts are forced out or evaporated during concrete production.

As previously noted, during the cement hydration process, many of the chemical reactions that take place, some of which may happen generally concurrently. The hydration process begins at an initial set point that starts the reaction—where a piece of cement and water contact. The finer the particle, the more areas of each one of those pieces of concrete then start to form. Those formations are the building blocks of the concrete. The products and methods provided herein facilitate each piece of concrete growing larger and having more contact angles and more expansion. The reactions of each cement particle cause the cement to grow both outwardly and inwardly. The products and methods provided herein enable the concrete to grow both inwardly and outwardly more efficiently. Effectively, each piece of cement grows such that the space that, for example, ten pieces of cement would take in a piece of concrete will now be filled by approximately five pieces of cement. This results in a higher density concrete.

During typical concrete production, the industry uses as little water as possible. Generally, only enough water is supplied to start the hydration reaction. For example, in formation of cement blocks, a minimal amount of water is added to start the hydration reaction and then the blocks are pressed and allowed to cure. The common understanding is that if too much water is added into the concrete blocks, they will not form and will not harden correctly—they will deteriorate.

Typically, as the water:cement ratio increases, so does porosity. Using the product and methods disclosed herein, this is not the case. The spacing of the cement particles is controlled by the pure pore solution and most available water is consumed, with the space left behind being filled with cement hydrates. Hydration is the backbone of cement. The product and methods disclosed herein allow one to control it.

Using the systems and methods provided herein, each piece of cement as formed into concrete takes the volume of approximately two pieces of cement as typically formed into concrete using known methods. Accordingly, half of the amount of cement is needed for the same amount of water. Stated otherwise, twice the amount of water is used for the same amount of cement. That being said, the specific water to cement ratio may be varied depending on the desired properties of the end product. Accordingly, systems and methods described herein add additional hydration enhancing water during the concrete production process beyond what would be expected in the industry.

Additives

In further embodiments, the hydration enhancing water may be provided with other additives. For example, in production of self-consolidating concrete, additives are typically added for lubricity and to give the concrete the ability to flow and self-level. Accordingly, one or both of the exchange and loading resin or vegetative extracts disclosed herein may be designed to carry minerals to provide the lubricity factor, have a better hydration state, a better flow factor, and a better slump.

Hydration rates can be increased with set-accelerating admixtures that increase early strength gain and decrease the length of time to initial set and final set. Accelerators are often used to offset the delaying effects caused by colder ambient temperatures. In contrast, set-retarding admixtures can be used to decrease hydration rates. Retardants decrease early strength gain and increase the length of time to initial and final set. These admixtures are often used in hot weather climates, or to allow additional time for special finishing techniques or difficult placings. Such admixtures may be added to the hydration enhancing water or otherwise used during hydration.

Supplementary cementitious materials ("SCMs") can also be added as a substitute for some portion of Portland cement. Depending on the type, SCMs can enhance or inhibit certain hydration actions. SCMs most commonly include fly ash, ground granulated blast-furnace slag, and silica fume. SCMs may be used during the hydration processes described herein.

Method

Figure 7:
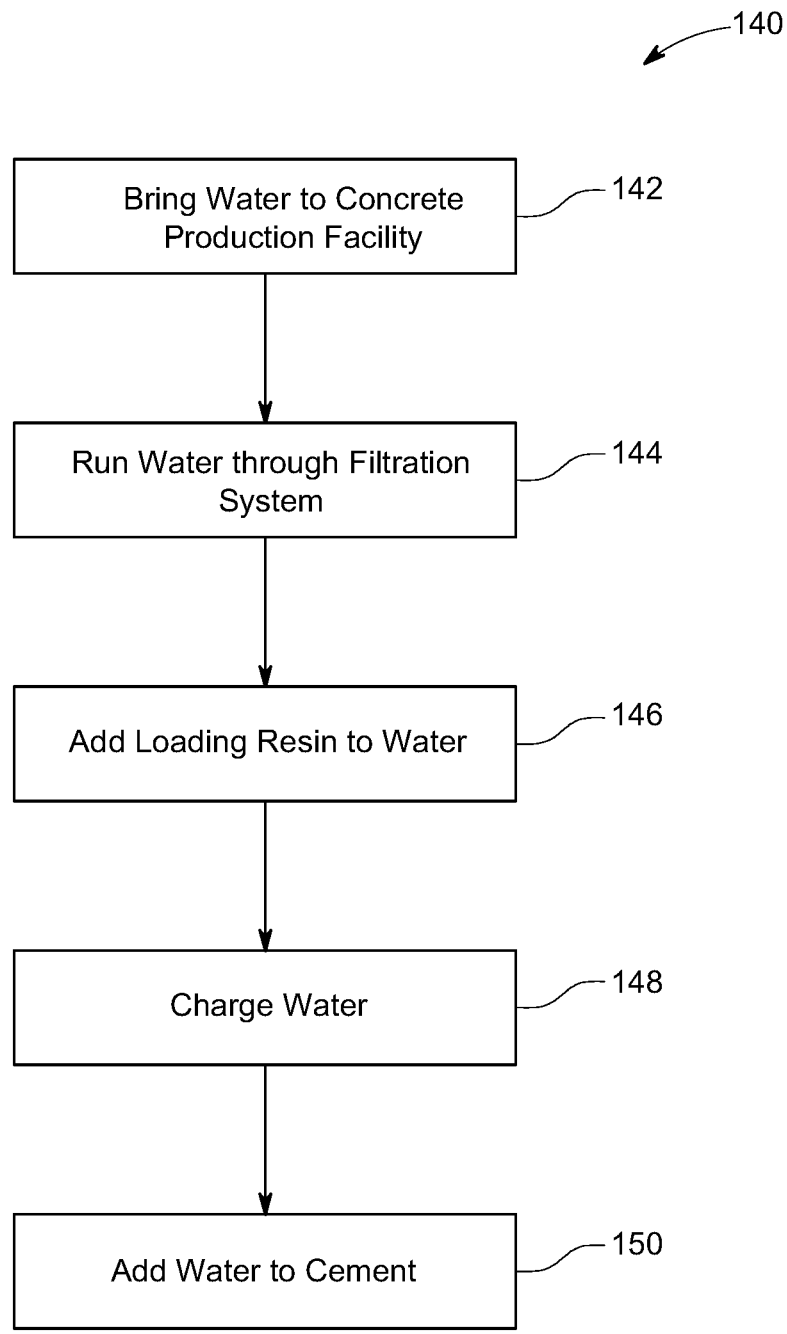
FIG. 7 illustrates a method for enhanced hydration of concrete, in accordance with one embodiment.

FIG. 7 illustrates a method 140 for enhanced hydration of concrete, in accordance with one embodiment. As shown, water is brought to, or received at, a concrete production facility 142. This water is run through a filtration system 144, such as an ion exchange filtration system, a loading resin or vegetative extract is added 146, the loading resin or vegetative extract being selected based on the type of concrete being formed, the water with resin or vegetative extract is charged 148 to form hydration enhancing water, the hydration enhancing water is added to cement 150 to form a cement paste, and the cement paste is mixed with aggregates. In general, the amount of hydration enhancing water is a multiple of the amount of untreated water that would typically be used. For example, the amount of hydration enhancing water may be 1.2×, 1.5×, or 2.0× the amount of untreated water that would normally be used during concrete production. Delivery of the hydration enhancer may follow typical batching for concrete, mortar, and stucco. The hydration enhancer may be added to the batch water or wet mix and volume is dependent upon cement weight.

It is axiomatic within the concrete industry that the lower the percentage of water relative to cement, the higher the quality of the cement paste. There needs to be enough water combined with the cement that the resultant concrete has sufficient workability in its wet state. However, this conventional wisdom indicates that any additional included water beyond the amount required to provide that workability has been considered to lessen the quality of the final concrete product. This traditional wisdom further suggests that any additional water beyond what is required to achieve complete hydration will remain in the mix until it evaporates, thus leaving void spaces that do not contribute to compressive strength of the concrete, and greatly increases concrete's propensity to weaken due to a variety of different factors. On the other hand, if there is not enough water available to complete hydration, unhydrated cement will remain in the mix, which is considered a waste of money, due to the fact that unhydrated cement provides no strength or durability to concrete.

High-quality concrete may be characterized as having little to no spalling, cracking, alkali-silica reactions ("ASR"), or efflorescence, while at the same time having maximal strength and life-span and reducing cost and the negative impact on the environment. Spalling means that cracks are present below the surface of the hardened concrete, which may cause portions of the concrete to "spall off." ASR or alkali-silica reactions are sometimes referred to as "concrete cancer." ASR is a swelling reaction that occurs over time in concrete between the highly alkaline cement paste and the reactive non-crystalline (amorphous) silica found in many common aggregates, given sufficient moisture. Efflorescence is a white powdery substance sometimes present on the surfaces of unsealed concrete, which is also sometimes seen as a white blush on sealed concrete floors. Efflorescence is caused by vapor migrating through the slab bringing soluble salts to the surface of the concrete.

The treatment composition, or hydration enhancing water or pure pore solution, disclosed herein and methods of making concrete using the treatment composition result in cement and concrete exhibiting the properties of high-quality concrete that may avoid the above negative qualities. In some embodiments, novel and advantageous vegetative extracts, or alternatively loading resins, are provided to create the hydration enhancing water used during the hydration process. Because the process of dispersing elements and compounds within water-borne resins is complex and difficult, the ability to maintain control over these components allows for the ability to tailor the end results of the final concrete product by manipulating chemical reactions to create the target compounds.

In some embodiments the novel additive may be a hydrogen bonded dispersion agent. The needle-like microstructure of cement formed during hydration is a significant part of what gives hydrated cement its properties. The use of the novel and advantageous additive(s) of the present disclosure allows the development of this cement microstructure during hydration to be predicted, controlled, and therefore improved over known cement formulations. By controlling needle growth and organization during cement hydration with a custom loading resin or vegetative extract in a hydration enhancing water, low shrinkage cement with increased strength can be developed. Further, the hydration enhancing water and method prevent water and vapor migration through the concrete structure, which reduces spalling, cracking, alkali-silica reactions ("ASR") and corrosion, in addition to preventing efflorescence and adding overall strength.

During hydration, the cement first begins to dissolve upon contact with water, which releases ions. This is called pore solution. Cement materials are highly soluble in the presence of water and combine to form a concentration of ionic species that increase rapidly. This may result in the pore solution becoming super-saturated. Some of the ions may combine to form a solid phase, which is the hydrated product of the reaction. These hydrates are chemically and structurally different from the original cement materials. The inventive process relieves the pore solution of its saturation and allows the cement minerals to continue dissolving and thereby be replaced with the hydration products. The pore solution therefore acts as a transition zone between the initial introduction of water and the solid phase.

As was previously discussed, each of the five major components of Portland cement (also commonly referred to as Ordinary Portland cement or "OPC") tricalcium silicate, dicalcium silicate, tricalcium aluminate, ferrite, and gypsum form different solid phases during hydration and react at different rates. Each of these minerals dissolve into the pore solution. The hydration of the calcium silicate produces CSH (calcium silicate hydrate) and CH (calcium hydroxide). The CSH paste or gel is a significant hydration product and one of the most complex. CSH gel is a fairly unstable phase that continues to form and bind the original cement particles into a cohesive whole. No other hydration products form strong bonds to the solid phase, although they may form relatively strong crystal structures. However, these other hydration products typically do not contribute much to the overall strength of concrete.

The initial dissolving of ions into water during hydration is a key point at which the hydration enhancing water begins to work. In some embodiments, the hydration enhancing water immediately begins to work to develop and enhance pore solution. The added stability and control during creation of the pore solution allows for more complete chemical reactions and continuous dissolution of cement minerals. The pure pore solution created in embodiments of the present invention creates more paste and increases density in the CSH gel morphology. The added control over the cement hydration microstructure is achieved in the present invention by sustaining hydration at the cement particle level, reducing tension of capillary water, maintaining heat of hydration, and controlling the needle growth and crystal structure of the concrete.

While the CSH gel is complex, it can be simplified into two general features: pore system and morphology. During the pore system, CSH gel does not take on the form of a monolithic solid as it grows outward from the cement particle. Instead, it develops an internal system of pores. These gel pores are filled with pore solution that is not chemically bound to the CSH phase and remains isolated from further chemical reaction. The morphology of CSH can be thought of as high-density and low-density. When the CSH gel grows outward and connects into a continuous phase, it occupies the space originally filled with water. This morphology is less dense (porous). As the CSH gel grows inward toward the cement particle, it is denser (less porous). The low density portions fill quickly, which provides early strength. The high density develops more slowly over time. Because the low density grows into the porosity that has been vacated by water, it is considered more important than high density. For the outward growth of CSH gel, it occupies more volume than the minerals it replaces. The outward expansion and continuous phase connection causes the paste to set and harden. Because the volume of paste does not change, the increase in the volume of solid phase or set causes the capillary system to decrease. Thus, in theory, if the water to cement ratio is low enough, it can reduce the capillary system. Embodiments of the present disclosure through the use of the inventive additive may achieve capillary closure without a reduction in water, which allows for increased hydration to the cement particles.

The morphology of the solid phases has a greater impact on the microscopic structure than its chemical composition. The pore system and combined solid phase morphology are the major components making up the microstructure. Solid phase morphology depends upon many factors including temperature, formation mechanisms, the crystal structure and the space or area for the phase to form. The chemical and microstructure of concrete control its properties. Unlike the chemical structure that is essentially fixed, the microstructure of concrete is dependent on how it is made, and therefore controllable in theory.

Concrete is often characterized by the water to cement ratio in the concrete. It has been thought that the less amount of water present, the greater strength the concrete will have. Despite this conventional belief, the water/cement ratio is also directly related to the spacing between the cement particles in the cement paste. The smaller the spacing, the faster the cement hydrates can fill in the space between the cement particles. Small spaces for the reactions to occur, allows for stronger bonds that create stronger concrete. However, with higher water/cement ratios, the water is rapidly drawn into the hydration process. This self-desiccation creates very fine capillaries. The finer capillaries cause the water meniscus to have a smaller curvature, creating capillary pressure. This stress on the walls creates autogenous shrinkage as the paste is pulled inwards.

Aggregates play an important role in concrete. The shape and size distribution of the aggregates help determine the consistency and ease of placement. The aggregates are bonded together by the paste. The contact point between paste and aggregate is called the interfacial transition zone ("ITZ"). This area surrounding the aggregate is more porous than the bulk paste. Cracking and expansion is the result of the aggregate reacting with the paste, which causes ASR.

Typically, as the water/cement ratio increases, so does the porosity of the paste. This is not the case in formulations that include the inventive additive(s). In embodiments of the present disclosure that include the additive(s), the cement particle spacing is controlled by the pure pore solution and nearly all of the available water is consumed, and the space left behind is filled with the cement hydrates. Additionally, after the concrete has set, the polymer forms from the pore solution within the porosity matrix holding free moisture, and therefore acting as an internal curing agent.

Different formulations of the present disclosure may be tailored to meet specific cement formulations' unique signatures for ultimate hydration. Further, the hydration enhancing water may be altered for specific batch designs by changing the chemical substances to be ideally suited for the desired use. For example, not all plasticizers are suitable for every polymer. Each plasticizer has a different effect on the host molecule. Embodiments of the present disclosure including the inventive vegetative extract and/or loading resin can be adjusted to optimize the fit with respect to the molecular configuration of the mix and admixtures in use.

Because embodiments of the present disclosure allow for the control of the process of microstructure creation during hydration, the added benefits over known formulations and techniques for concrete development, include, but are not limited to: increased strength, but still compressive and flexural; reduced spalling; reduced efflorescence; reduced shrinkage; reduced and/or eliminated ASR; controlled heat of hydration; increased freeze/thaw resistance; reduced chloride; faster finishing and placing; reduced and/or eliminated bleed water; assisted freeze control in early development; eliminates dusting; eliminates electrostatic discharge; and protects imbedded steel.

EXAMPLES OF FORMULATIONS OF EMBODIMENTS OF THE PRESENT DISCLOSURE

Example #1

This embodiment includes a water-borne multifunctional resin, formulated as a sealant for concrete block, fluted block, split faced block and other large porosity concrete products. This formulation is an ideal primer for concrete block surfaces that receive paint, as this formulation enhances the bonding quality of the surface. This formulation substantially reduces and/or eliminates pealing, cracking and bond loss caused by capillary moisture and internal chemical reactions.

Properties of Example #1 Formulation

Example #1 formulation includes the properties of: sealing the matrix; hardening the surface; retarding dusting; adding density; substantially permanently waterproofing; and substantially delaying or eliminating efflorescence. Example #1 further includes the following properties:

Physical: Liquid
Color: Milky white
Oder: None
Shelf life: 1 year
Specific Gravity: 1.15
Flash point: None
PH: 11.5±
VOC: Zero
Applicable Standards
Meets or exceeds the following standards:

| ASTM C 67 | Efflorescence |
| ASTM C 666 | Freeze-thaw resistance |
| ASTM C 67 | Water absorption |
| ASTM C 23 69 | Weathering |

Example #2

The formulation for Example #2 includes a water-borne multifunctional resin, formulated for use as a batching admixture in the manufacturing process of concrete block. This formulation enhances the calcium hydroxide and increases calcium silicate hydrate adding density, strength and waterproofing to the concrete block.

Properties of Example #2 Formulation

Example #2 formulation includes the properties of: reducing breakage; adding strength; providing waterproofing; and substantially delaying or eliminating efflorescence Physical: Liquid
Color: Milky white
Oder: None
Shelf Life: 1 year
Specific Gravity: 1.12
Flash point: None
PH: 11±
VOC: Zero
Applicable Standards
Meets or exceeds the following standards:

| ASTM C 309 93 | Curing compound |
| ASTM C 666 | Freeze-thaw resistance |
| ASTM C 67 | Water absorption |

Example #3

The formulation for Example #3 includes a water-borne multifunctional resin, formulated as a penetrating sealer for existing concrete structures. Penetration via capillary structure allows for reaction with calcium hydroxide and free alkali to form a permanent hydro-gel. This reaction integrally waterproofs, preserves and strengthens the concrete forming a breathable barrier within the concrete pores and voids. Reduction in water and moisture vapor migration is reduced and remains permanently in place. Imbedded steal is protected by the expelling of chlorides and acidic residual concentration within the concrete capillaries stopping corrosion.

Properties of Example #3 Formulation

Example #3 formulation includes the properties of: increased strength; sealing; promoting paint and coating adhesion; reducing spalling; purging contaminants and minimizing or eliminating efflorescence Physical: Liquid
Color: Clear/Opaque
Oder: None
Shelf Life: 1 year
Specific Gravity: 1.15
Flash point: None
Ph: 11±
VOC: Zero
Applicable Standards
Meets or exceeds the following standards:

| ASTM C 309 93 | Curing compound |
| ASTM C 666 | Freeze-thaw resistance |
| ASTM C 67 | Water absorption |

Example #4

The formulation for Example #4 includes a water-borne multifunctional resin, formulated for use as an admix conditioner for concrete Stucco. Example #4 formulation reduces permeability, maintains hydration, reduces cracking, promotes adhesion, and increases tensile strength, while adding elongation.

Properties of Example #4 Formulation

Example #4 formulation includes the properties of: reducing cracking; making it waterproof, increasing tensile strength while adding elongation; promoting adhesion and maintaining hydration.

Physical: Liquid
Color: Clear/Opaque
Odor: None
Shelf life: 1 year
Specific Gravity: 1.12
Flash point: None
PH: 11±
VOC: Zero
Applicable Standards
Meets or exceeds the following standards:

| ASTM C 67 | Water absorption |
| ASTM C 666 | Freeze-thaw resistance |
| ASTM C 309 93 | Curing compound |

Example #5

The formulation for Example #5 includes a water-borne multifunctional resin, formulated for use as a hydration enhancing admix during concrete batching for ultimate hydration achievement; the ability to control the chemical and microstructure properties of concrete to create a low shrinkage cement with increased durability and compression strength while adding elongation. In addition, the CSH morphology is controlled in both high and low density thus reducing porosity.

Properties of Example #5 Formulation

Example #5 formulation includes the properties of preventing water and vapor migration through the concrete structures which stops efflorescence, ads strength, reduces spalling, cracking, shrinkage, ASR and corrosion of embedded steel.

Physical: Liquid
Odor: None
Shelf Life: 2 years
Specific Gravity: 1.12±
Flash Point: None
Ph: 10±
VOC: No
Non-Toxic
Non-Hazardous Vapor
Non-Flammable
Applicable Standards
Meets or Exceeds
ASTM C309
ASTM C1315
ASTM C494
ASTM C260
ASTM C618
ASTM C989
EPA Compliant
USDA requirements for use in food processing areas Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A method of making a treatment composition for improving cement performance, the method comprising:
   providing water;
   conditioning the water to form a conditioned water, wherein conditioning is done via filtration;
   preparing vegetation for extraction, thus creating a prepared vegetation;
   treating the prepared vegetation with a first portion of the conditioned water to form a solvent soaked vegetation;
   treating the solvent soaked vegetation to forma first vegetative solution and a first ash by separating the first vegetative solution from vegetation and treating the vegetation with heat to form the first ash;
   forming a hydration enhancing compound by mixing the first vegetative solution and the first ash;
   adding the hydration enhancing compound to a second portion of the conditioned water to form the treatment composition.

2. The method of claim 1, wherein the conditioned water has a Total Dissolved Solids level of 0000 PPM.

3. The method of claim 1, wherein the vegetation is one of live oak, philodendron, palm, bahia grasses, or aracae.

4. The method of claim 1, wherein preparing vegetation comprises grinding and milling the vegetation.

5. The method of claim 1, wherein forming the hydration enhancing compound further comprises mixing a second vegetative solution and a second ash with the first vegetative solution and the first ash, wherein the first vegetative solution and first ash comprise palm.

6. The method of claim 5, wherein the second vegetative solution and second ash comprise oak and the vegetative extract comprises 1 part oak, 1 part palm.

7. The method of claim 5, wherein the second vegetative solution and second ash comprise bahia and the vegetative extract comprises 1 part palm, 2 parts bahia.

8. The method of claim 1, wherein forming a hydration enhancing compound comprises forming a vegetative extract by combining the first vegetative solution and the first ash, and forming a hydration enhancing compound by combining the vegetative extract with a mineral.

9. The method of claim 8, wherein the mineral is lithium.

10. The method of claim 1, wherein the treatment composition comprises the hydration enhancing compound at a level of 0.17%.

11. The method of claim 1, wherein the first ash is formed using furnace burning.

12. A treatment composition for improving cement performance, the treatment composition comprising:
    conditioned water; and
    a hydration enhancing compound, wherein the hydration enhancing compound comprises:
       a first vegetative extract;
       a first vegetative ash; and
       a mineral;
    wherein the treatment composition comprises the hydration enhancing compound at a level of 0.17%.

13. The treatment composition of claim 12, wherein the conditioned water has a Total Dissolved Solids level of 0000 PPM.

14. The treatment composition of claim 12, wherein the vegetative extract and the vegetative ash are derived from one of live oak, philodendron, palm, bahia grasses.

15. The treatment composition of claim 12, wherein the mineral is lithium.

16. The treatment composition of claim 12, wherein the hydration enhancing compound further comprises a second vegetative extract and a second vegetative ash.

17. The treatment composition of claim 16, wherein the first vegetative extract and the first vegetative ash are derived from palm and the second vegetative extract and the second vegetative ash are derived from one of live oak, philodendron, or bahia grasses.

18. A method for improving cement performance, the method comprising:
    making a treatment composition for improving cement performance, the method comprising:
       providing water;
       conditioning the water to form a conditioned water;
       preparing vegetation for extraction, thus creating a prepared vegetation;
       treating the prepared vegetation with a first portion of the conditioned water to form a solvent soaked vegetation;
       treating the solvent soaked vegetation to form a first vegetative solution and first ash by separating the first vegetative solution from vegetation and treating the vegetation with heat to form the first ash;

forming a hydration enhancing compound by mixing the first vegetative solution and the first ash;

adding the hydration enhancing compound to a second portion of the conditioned water to form the treatment composition; and adding the treatment composition to cement.

19. The method of claim 18, wherein conditioning is done via filtration.

20. The method of claim 18, wherein the first ash is formed using furnace burning.

* * * * *